United States Patent [19]

Jabarin et al.

[11] Patent Number: 4,962,164

[45] Date of Patent: Oct. 9, 1990

[54] DEGRADABLE POLYMERS AND ARTICLES MADE THEREFROM

[75] Inventors: Saleh A. Jabarin, Holland, Ohio; Dennis C. Balduff, Florence, S.C.

[73] Assignee: Owens-Illinois Plastic Products Inc., Toledo, Ohio

[21] Appl. No.: 211,639

[22] Filed: Jun. 27, 1988

[51] Int. Cl.$^5$ ............................................. C08F 20/00
[52] U.S. Cl. ................................... 525/445; 525/185; 525/426
[58] Field of Search ........................................ 525/445

[56] References Cited

U.S. PATENT DOCUMENTS 4,137,382  1/1979  Vetter, Jr. ........................... 525/455
4,739,012  4/1989  Hagman ............................... 525/92

Primary Examiner—Melvyn I. Marquis
Assistant Examiner—Karen A. Hellender

[57] ABSTRACT

Degradable compositions of polyesters, polyamides, polystyrenes and polyvinyl chlorides containing effective degradable amounts of CO in the composition.

8 Claims, No Drawings

DEGRADABLE POLYMERS AND ARTICLES MADE THEREFROM

The present invention relates to a degradable polymer that is a polyester, polyamide, polystyrene or polyvinyl chloride and articles made therefrom.

BACKGROUND OF THE INVENTION

The present invention relates to environmentally degradable articles, films, bags together with containers fabricated from the degradable polymeric compositions including polyester, polyamide, polystyrene and polyvinyl chloride compositions.

A wide variety of environmentally degradable polymeric compositions have been used for the fabrication of containers, films, bags and the like in the past. Many have required chemical modification of the polymers and are difficult to work with and expensive. Many of these polymeric compositions required the use of photo-sensitive additives to a host polymer to impart environmental degradability to the articles, particularly by photodegradation mechanisms. The use of such additive systems has caused subtantial problems in the past. For example, such polymer-photosensitive additive systems have exhibited spontaneous separation of the components or component migration to surface of the article during and after melt extrusion. Further, such additive systems are often subject to discoloration or odor generation during processing of the melt. This requires the addition of dye colorants to maintain an acceptable product appearance. Further, such systems have had poor extrusion viscosity characteristics and poor thermoformability and have not exhibited the requisite stiffness or flexibility for certain applications.

In the past, a blended material of high density polyethylene or medium density polyethylene admixed with an ethylene-carbon monoxide copolymer in the concentrations of 3–50 percent ethylene-carbon monoxide copolymer, wherein the mixture contains about 0.1 to about 15 weight percent of carbon monoxide has been used for various articles. Such a degradable polyethylene ethylene-carbon monoxide copolymer material is described in German Patent document 2316697 entitled "Polymeric Substance Photo-Decomposable By the Action of Ultraviolet Irradiation."

The material disclosed in German patent document 2316697 is limited to high density polyethylene and medium density polyethylene having between 3–50 percent ethylene-carbon monoxide copolymer and discloses the use of copolymers of ethylene-propylene, ethylene-butene, ethylene-vinylacetate, ethylene-styrene, ethylene-methylacrylate and ethylene-hexene copolymers in the place of polyethylene. The polyethylene-ethylene-carbon monoxide blended materials disclosed in the 2316697 document degrades too rapidly for successful use in articles requiring flexibility. The 2316697 document has no suggestion of polyesters, polyamides, polystyrene and polyvinyl chloride. Accordingly, there exists a need in the art for environmentally degradable polymeric compositions (comprising polyesters, polyamides, polystyrene and polyvinyl chloride) having sufficient mechanical properties for use as an article which exhibits balanced environmental degradation, excellent mechanical properties, extrudability, thermoformability and does not spontaneously suffer component migration or separation upon melt extrusion formation or during use.

U.S. Pat. Nos. 4,709,808 and 4,714,741 of Jabarin and Balduff, assigned to Owens-Illinois, Inc., disclose degradable compositions and articles, the compositions having high density polyethylene, low density polyethylene and polypropylene plus a CO-containing polymer.

There is no suggestion in these patents of how to easily and economically prepare degradable polyesters, polyamides, polystyrenes or polyvinyl chloride.

SUMMARY OF THE INVENTION

The present invention provides, without the need for chemical modification of the polymers involved, a degradable composition comprising (A) a copolymer of ethylene and carbon monoxide used in an effective degradable amount for reducing the percent elongation in six months to 100% or lower, and (B) a polymer that is a polyester, a polyamide, a polystyrene or a polyvinyl chloride, the polymer comprising substantially the balance of the composition.

In a preferred embodiment, the present invention provides a degradable composition comprising (A) a copolymer of ethylene and carbon monoxide used in an amount sufficient to provide about 0.001% to 0.05% wt. % of CO in the composition, and (B) a polyester comprising substantially the balance of the composition.

In another embodiment, the present invention provides a degradable composition comprising (A) a copolymer of ethylene and carbon monoxide used in an amount sufficient to provide about 0.002% to 0.15% wt. % CO in the composition, an (B) a polyamide comprising substantially the balance of the composition.

The present invention also provides a degradable composition comprising (A) a copolymer of ethylene and carbon monoxide in an amount sufficient to provide only about 0.001% to 0.03% wt. % CO in the composition, and (B) polystyrene comprising substantially the balance of the composition.

In another embodiment, the present invention provides a degradable composition comprising (A) a copolymer of ethylene and carbon monoxide in an amount sufficient to provide only about 0.002% to 0.10% wt. % CO in the composition, and (B) polyvinyl chloride comprising substantially the balance of the composition.

The present invention also provides inexpensive, easily prepared, articles with controlled degradation rates, the articles being preferably containers including bags, or films or nets or container carriers.

In the degradable composition comprising a polyester, the amount of CO in the composition is generally about 0.001 wt. % to about 0.05 wt. % and preferably about 0.01 to 0.02 wt. %. In the polyamide composition, the amount of CO is preferably about 0.004 to 0.10 wt. %.

The degradable polymeric compositions according to the present invention show improved processing characteristics, including the capability to be formed by extrusion, thermoforming, injection blow molding, stretch blow molding, extrusion blow molding and molding as part of a multilayer material composition. The compositions also show improved thermoformability, improved resistance to spontaneous delamination of the admixed component materials; a balanced environmental degradation characteristic, as well as low cost of production compared to conventionally available degradable polymeric resinous material compositions.

A useful ethylene-carbon monoxide copolymer is a copolymer of ethylene and carbon monoxide having a melt index of between 0.6 G/10 min and 1.3 G/10 min; a density of between 0.925 grams/cc and 0.935 grams/cc; an ultimate elongation of about 500 percent; a tensile strength of between 2,200 psi and 2,500 psi; and a carbon monoxide content of about on weight percent of the copolymer. Obviously, any ethylene-carbon monoxide copolymer having more than about one weight percent carbon monoxide can be used in smaller quantities to supply equivalent amounts of the carbon monoxide moiety.

A preferred ethylene-carbon monoxide copolymer, useful for all embodiments of the present invention, is that material supplied by Union Carbide Corporation as product DHDG-4164 ECO. The ethylene-carbon monoxide copolymer supplied by Union Carbide Corporation has the following physical properties: a melt index of 1.2 G/10 min.; a density of 0.934 grams/cc; an ultimate elongation of 520%; a tensile strength of 2250 psi and a carbon monoxide content of a range of 0.7 to 1.1 percent carbon monoxide over the entire range.

With all embodiments of the invention, it is preferred to use granular polymers for admixing together by any conventional means to form the proper weight percent of the appropriate polymers mixed with the ethylene-carbon monoxide copolymer. Typically, the granules of separate components of the admixture are mixed together in a granule mixer to form a homogeneous granular feedstock. The granular feedstock is processed by extrusion or similar processing to form sheets, tubes or container parisons which are then converted into final products by the methods described above. Preferably, additional mixing occurs during the melting and forming process to assure a nearly homogeneous polymeric blend which is processed according to the methods described above to form the final desired articles according to the present invention.

Granular blending is preferably accomplished with a multiple compartment, belt-fed Whitlock Blender, equipped with a mixing bar. Granular mix is fed to the extruder by pneumatic tube transport. To form melt extruded sheetstock, a Davis-Standard Thermatic extruder, equipped with System 101 controller and 6 inch screw, with an L/D=34, fed to a Kenics mixer and 80 inch autoflex die is preferably used to extrude the sheetstock.

A series of PET/ECO (polyethylene terephthalate/ethylene CO copolymer) blends were prepared and tested in a 180° bending test, the test samples breaking to show degradation after an ultra-violet light exposure time. The U.V. light exposure results represent accelerated tests, based on a 12 hr. exposure day and are reported in terms of equivalent time in months.

The sample preparation and exposure distance from the U.V. light source are as follows:

| Sample Prep. |
| --- |
| 1. Dry material @ 100° C. for 18 to 24 hrs. under vac. |
| 2. Dump into running Brabender w/stand die@ 285° C. @ 70 rpm. |
| 3. Quench strand, chop & redry. |
| 4. Re-extrude as above (#2). |
| 5. Press chopped strand @ 250° C. to 17 mils and water quench out of Carver press. |
| 6. Cut into ¼" × 4" strips for U.V. exposure |
| 7. Expose 4" from U.V. light. |

The PET used was Goodyear polyethylene terephthalate having an I.V. of 1.0. The CO copolymer used was U.S. DHPP-4164 (containing 1.0% by weight of CO).

The results are as follows.

| | # 180° bends to break |
| --- | --- |
| PET/ECO (99.5%/0.5%) U.V. Exposure time* (Mo.) | |
| 0.5 | >50 (did not break) |
| 1.0 | >50 (did not break) |
| 1.5 | 32 |
| 2.0 | 20 |
| 3.0 | 8 |
| 4.0 | 5 |
| PET/ECO (99.0%/1.0%) | |
| 0.5 | >50 (did not break) |
| 1.0 | 42 |
| 1.5 | 19 |
| 2.0 | 7 |
| 3.0 | 4 |
| 4.0 | 3 |
| PET/ECO (95%/5%) U.V. Exposure time (Mo.) | |
| 0.5 | 22 |
| 1.0 | 14 |
| 1.5 | 4 |
| 2.0 | 3 |
| 3.0 | 1 |
| 4.0 | 1 |
| PET (100%) - Control | |
| 0.5 | >50 (did not break) |
| 1.0 | >50 (did not break) |
| 1.5 | >50 (did not break) |
| 2.0 | >50 (did not break) |
| 3.0 | >50 (did not break) |
| 4.0 | >50 (did not break) |
| 100% ECO - Control | |
| 0.5 | 4 |
| 1.0 | 2 |
| 1.5 | 1 |
| 2.0 | 1 |
| 3.0 | 1 |
| 4.0 | 1 |

As seen in the results, the effective degradable amount of CO in the PET/ECO composition to reduce the flexibility, the ability to withstand 180° bending and reduce the % elongation to 100% or lower in 6 months, is about 0.001 to 0.05 wt. % Co in the composition.

A series of samples of NYLON/ECO (nylon 6,6 /ethylene CO copolymer) blends were made and tested.

| NYLON/ECO Blends A. Materials - 1. Allied 6,6 (capron nylon-polyamide) 2. ECO, U.S. (1% CO in copolymer) | |
| --- | --- |
| | # ¼° bends to break |
| NYLON/ECO (99.5%/0.5%) U.V. Exposure Time (Mo.) | |
| 0.5 | >50 (did not break) |
| 1.0 | >50 (did not break) |
| 1.5 | >50 (did not break) |
| 2.0 | >50 (did not break) |
| 3.0 | 41 |
| 4.0 | 33 |
| NYLON ECO/(95%/5%) | |
| 0.5 | >50 (did not break) |
| 1.0 | >50 (did not break) |
| 1.5 | 37 |
| 2.0 | 30 |
| 3.0 | 17 |
| 4.0 | 11 |
| NYLON/ECO (90%/10%) | |

NYLON/ECO Blends
A. Materials -
1. Allied 6,6 (capron nylon-polyamide)
2. ECO, U.S. (1% CO in copolymer)

|  | # ¼° bends to break |
|---|---|
| 0.5 | >50 (did not break) |
| 1.0 | 29 |
| 1.5 | 16 |
| 2.0 | 12 |
| 3.0 | 5 |
| 4.0 | 3 |
| NYLON (100%) - Control | |
| 0.5 | >50 (did not break) |
| 1.0 | >50 (did not break) |
| 1.5 | >50 (did not break) |
| 2.0 | >50 (did not break) |
| 3.0 | 43 |
| 4.0 | >50 (did not break) |

The polyesters are preferably PET or copolymers of PET and other polyester-forming monomers such as isophthalic acid and ethylene glycol. The PET generally has an I.V. of at least about 0.6 up to 1.1 or 1.2. A suitable polyester is a copolyester of isophthalic or terephthalic acid and a sulfone.

The polyamides are preferably nylon 6,6 (reaction product of adipic acid and hexamethylenediamene) and polycaprolactam.

The polystyrenes are preferably homopolymers of styrene or copolymers of styrene (preferably about 75-95 wt. %) and another vinyl monomer such as vinyl acetate. The polystyrene can be plasticized and impact-modified.

The polyvinyl chlorides are preferably homopolymers of vinyl chloride or copolymers of vinyl chloride (preferably 75-95 wt. %) and a copolymerizable monomer such as vinyl acetate. The polyvinyl chlorides are generally plasticized with plasticizers as well as and used with other additives as is known in the art.

What is claimed is:

1. A degradable composition consisting essentially of
   (A) a copolymer of ethylene and carbon monoxide used in an amount sufficient to provide about 0.001% to 0.05% wt. % of CO in the composition to reduce the percent elongation in six months to about 100% or lower, and
   (B) a polyester comprising substantially the balance of the composition.

2. A degradable composition as defined in claim 1 in which the polyester is a copolyester of terephthalic or isophthalic acid and ethylene glycol.

3. A degradable composition as defined in claim 1 in which the polyester is polyethylene terephthalate.

4. A degradable composition as defined in claim 1 in which the polyester is a copolyester of isophthalic or terephthalic acid and ethylene glycol and a sulfone.

5. A composition as defined in claim 1 in which the total amount of CO in the composition is about 0.01% to 0.02% wt. %.

6. An article comprising a composition as defined in claim 3.

7. A polyester article made with the composition of claim 1.

8. A polyester container made of the composition as defined in claim 1.

* * * * *